United States Patent
Straub, Jr.

(10) Patent No.: US 7,966,893 B2
(45) Date of Patent: Jun. 28, 2011

(54) ADJUSTING TRANSDUCER FREQUENCY WITHOUT CEASING FLUID FLOW THROUGH A METER

(75) Inventor: Henry C. Straub, Jr., Sugar Land, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 175 days.

(21) Appl. No.: 12/485,424

(22) Filed: Jun. 16, 2009

(65) Prior Publication Data
US 2010/0313676 A1   Dec. 16, 2010

(51) Int. Cl.
*G01F 1/66* (2006.01)
(52) U.S. Cl. ............ 73/861.28; 702/45
(58) Field of Classification Search ............ None
See application file for complete search history.

(56) References Cited

U.S. PATENT DOCUMENTS

| | | | |
|---|---|---|---|
| 3,097,526 A * | 7/1963 | Fischbacher | 73/861.29 |
| 3,976,968 A * | 8/1976 | Slaton et al. | 367/95 |
| 4,096,754 A | 6/1978 | Beveridge | |
| 4,164,865 A * | 8/1979 | Hall et al. | 73/861.28 |
| 4,203,322 A * | 5/1980 | Brown et al. | 73/861.27 |
| 4,320,666 A * | 3/1982 | Redding | 73/861.28 |
| 4,742,717 A | 5/1988 | Ichino | |
| 5,077,701 A * | 12/1991 | Lill | 367/98 |
| 5,962,790 A * | 10/1999 | Lynnworth et al. | 73/644 |
| 6,343,511 B1 * | 2/2002 | Lynnworth et al. | 73/644 |
| 6,925,891 B2 * | 8/2005 | Suginouchi et al. | 73/861.27 |
| 7,061,163 B2 * | 6/2006 | Nagahara et al. | 310/334 |
| 7,307,373 B2 | 12/2007 | Straub, Jr. et al. | |
| 7,397,168 B2 | 7/2008 | Straub, Jr. et al. | |
| 2001/0045132 A1 * | 11/2001 | Dias et al. | 73/861.29 |
| 2004/0113522 A1 * | 6/2004 | Nagahara et al. | 310/326 |
| 2005/0236932 A1 * | 10/2005 | Nagahara et al. | 310/328 |
| 2007/0035211 A1 * | 2/2007 | Straub et al. | 310/348 |
| 2007/0035212 A1 * | 2/2007 | Straub et al. | 310/348 |
| 2007/0277608 A1 * | 12/2007 | Lopatin et al. | 73/584 |
| 2008/0060195 A1 * | 3/2008 | Straub et al. | 29/854 |
| 2009/0007694 A1 * | 1/2009 | Breeuwer | 73/861.25 |

FOREIGN PATENT DOCUMENTS
JP   2006194634 A   7/2006

OTHER PUBLICATIONS
International Application No. PCT/US2010/036134, Search Report and Written Opinion dated Dec. 24, 2010, 10 pages.

* cited by examiner

*Primary Examiner* — Harshad Patel
(74) *Attorney, Agent, or Firm* — Conley Rose, P.C.

(57) ABSTRACT

A method comprises, without ceasing flow of fluid through a flow meter, transmitting an ultrasonic signal of a first frequency through the fluid, adjusting the first frequency to a second frequency, and transmitting another ultrasonic signal of the second frequency through the fluid.

15 Claims, 10 Drawing Sheets

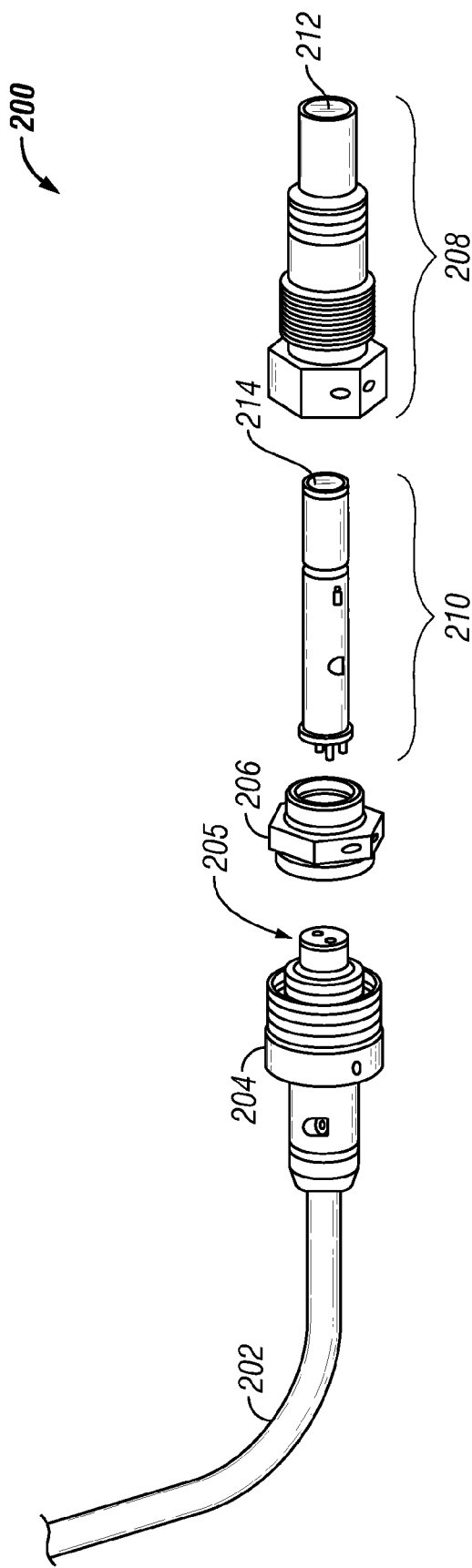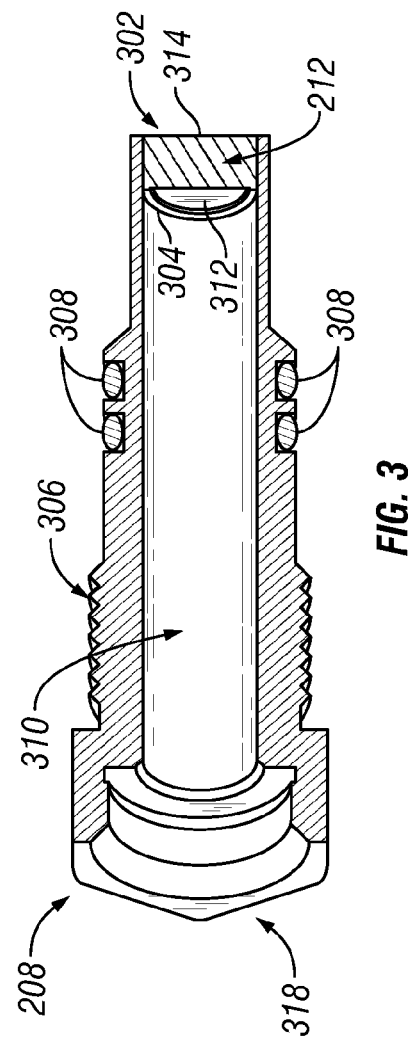

ADJUSTING TRANSDUCER FREQUENCY WITHOUT CEASING FLUID FLOW THROUGH A METER

BACKGROUND

After hydrocarbons are removed from the ground, the fluid stream (such as crude or natural gas) is transported from place to place using pipelines. Ultrasonic flow meters that are coupled to these pipelines may be used to assess various characteristics of the fluid stream (e.g., the amount or speed of fluid flowing in the stream). In an ultrasonic flow meter, ultrasonic signals are sent back and forth across the fluid stream to be measured and, based on various characteristics of the ultrasonic signals, a fluid flow may be determined.

Mechanisms that improve the quality of the ultrasonic signals imparted to the fluid may improve measurement accuracy. Moreover, ultrasonic flow meters may be installed in harsh environments, and thus any mechanism to reduce maintenance time and, if possible, improve performance, is desirable.

BRIEF DESCRIPTION OF THE DRAWINGS

For a more detailed description of embodiments disclosed herein, reference will now be made to the accompanying drawings, wherein:

FIG. 2 illustrates an assembly in accordance with embodiments;

FIG. 3 illustrates a perspective cross-sectional view of a transducer housing in accordance with embodiments;

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

"Fluid" shall mean a liquid (e.g., crude oil or gasoline) or a gas (e.g., methane).

DETAILED DESCRIPTION

Figure 1A:
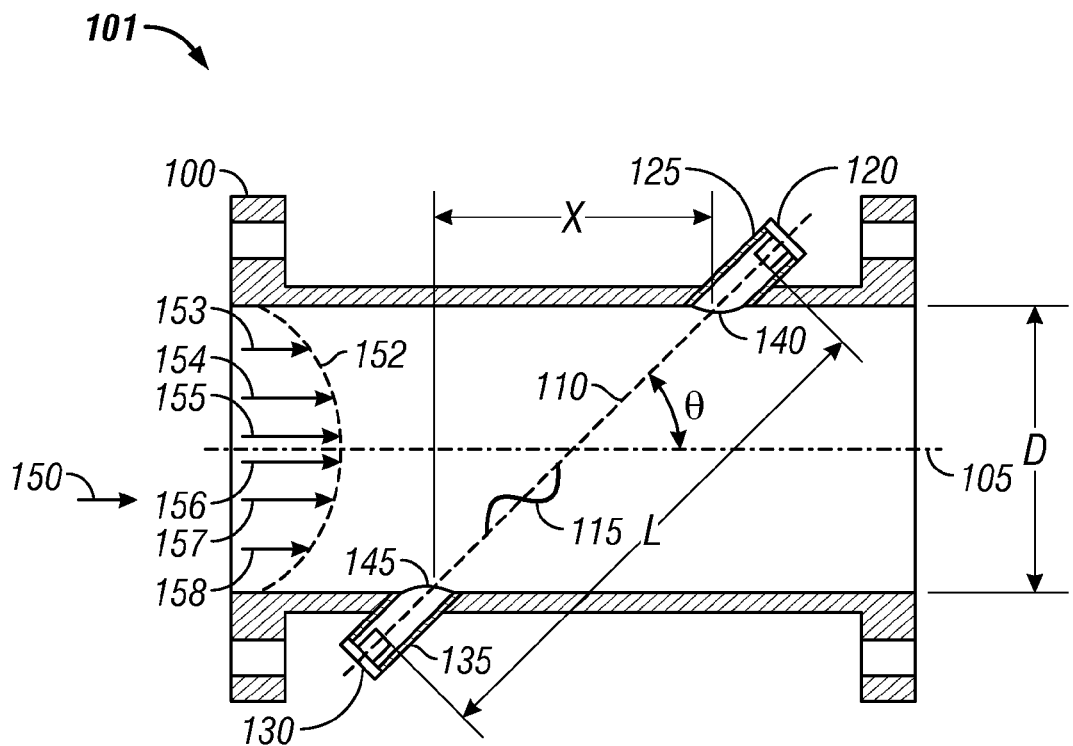
FIG. 1A is an elevational cross-sectional view of an ultrasonic flow meter.

FIG. 1A is an elevational cross-sectional view of an illustrative ultrasonic meter 101. Spoolpiece 100, suitable for placement between sections of a pipeline, is the housing for the meter 101. The spoolpiece 100 has an internal volume that is a flow path for a measured fluid and also has a predetermined size that defines a measurement section within the meter. A fluid may flow in a direction 150 with a velocity profile 152. Velocity vectors 153-158 illustrate that the fluid velocity through spoolpiece 100 increases toward the center.

A pair of transducers 120 and 130 is located on the circumference of the spoolpiece 100. The transducers 120 and 130 are accommodated by a transducer port 125 and 135, respectively. The position of transducers 120 and 130 may be defined by the angle θ, a first length L measured between transducers 120 and 130, a second length X corresponding to the axial distance between points 140 and 145, and a third length D corresponding to the pipe diameter. In most cases distances D, X and L are precisely determined during meter fabrication. Further, transducers such as 120 and 130 may be placed at a specific distance from points 140 and 145, respectively, regardless of meter size (i.e. spoolpiece size). Although the transducers are illustrated to be recessed slightly, in alternative embodiments the transducers protrude into the spoolpiece.

A path 110, sometimes referred to as a "chord," exists between transducers 120 and 130 at an angle θ to a centerline 105. The length L of "chord" 110 is the distance between the face of transducer 120 and the face of transducer 130. Points 140 and 145 define the locations where acoustic signals generated by transducers 120 and 130 enter and leave fluid flowing through the spoolpiece 100 (i.e. the entrance to the spoolpiece bore).

Transducers 120 and 130 are preferably ultrasonic transceivers, meaning that they both generate and receive ultrasonic signals. "Ultrasonic" in this context refers to frequencies above about 20 kilohertz. To generate an ultrasonic signal, a piezoelectric element is stimulated electrically, and it responds by vibrating. The vibration of the piezoelectric element generates an ultrasonic signal that travels through the fluid across the spoolpiece to the corresponding transducer of the transducer pair. Similarly, upon being struck by an ultrasonic signal, the receiving piezoelectric element vibrates and generates an electrical signal that is detected, digitized, and analyzed by electronics associated with the meter. Initially, downstream transducer 120 generates an ultrasonic signal that is then received by upstream transducer 130. Some time later, the upstream transducer 130 generates a return ultrasonic signal that is subsequently received by the downstream transducer 120. Thus, the transducers 120 and 130 play "pitch and catch" with ultrasonic signals 115 along chordal path 110. During operation, this sequence may occur thousands of times per minute.

The transit time of the ultrasonic signal 115 between transducers 120 and 130 depends in part upon whether the ultrasonic signal 115 is traveling upstream or downstream with respect to the fluid flow. The transit time for an ultrasonic signal traveling downstream (i.e. in the same direction as the flow) is less than its transit time when traveling upstream (i.e. against the flow). The upstream and downstream transit times can be used to calculate the average flow velocity along the signal path, and may also be used to calculate the speed of sound in the fluid. Knowing the cross-sectional area of the meter carrying the fluid and assuming the shape of the velocity profile, the average flow velocity over the area of the meter bore may be used to find the volume of fluid flowing through the meter 101.

Figure 1B:
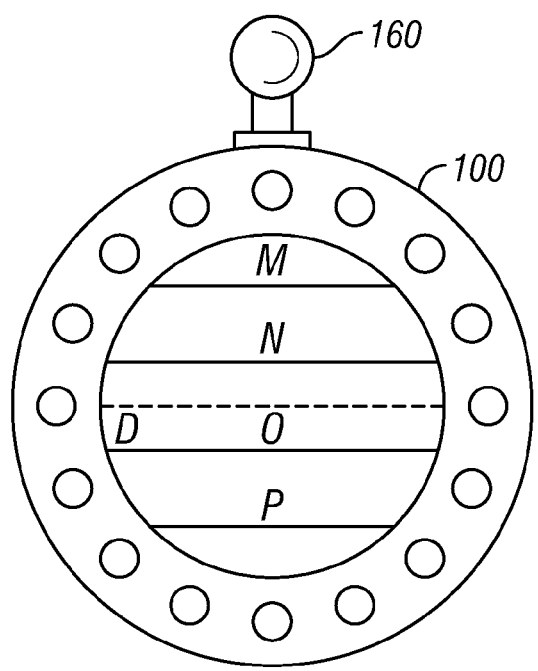
FIG. 1B is an elevational end view of a spoolpiece which illustrates chordal paths M, N, O and P.

Ultrasonic flow meters can have one or more pairs of transducers corresponding to one or more paths. FIG. 1B is an elevational end view of a spoolpiece having a diameter D. In these embodiments, spoolpiece 100 comprises four chordal paths M, N, O, and P at varying levels through the fluid flow. Each chordal path M-P corresponds to two transducers behaving alternately as a transmitter and receiver. Also shown are control electronics 160, which acquire and process data from the four chordal paths M-P. Hidden from view in FIG. 1B are the four pairs of transducers that correspond to chordal paths M-P.

Figure 1C:
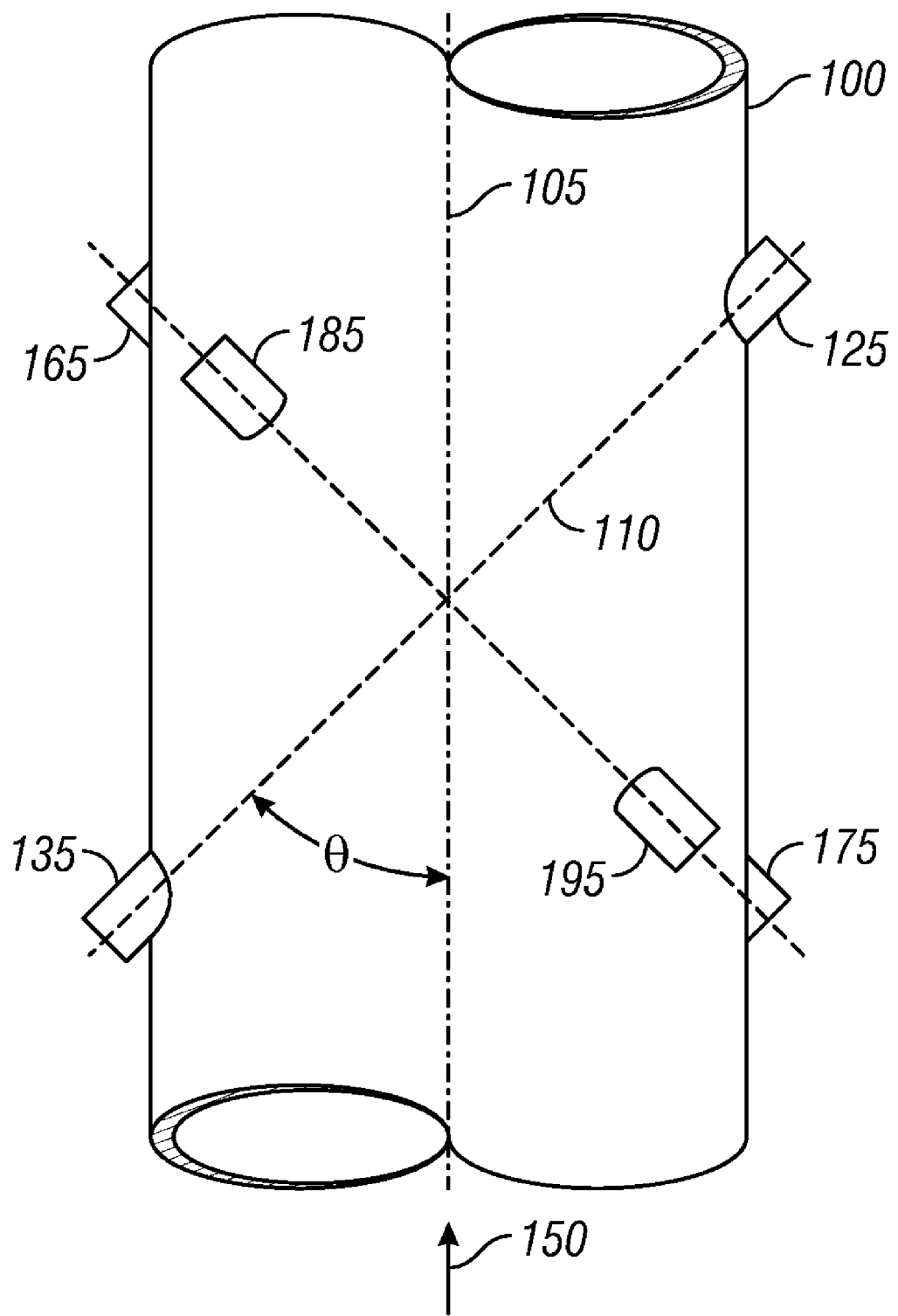
FIG. 1C is a top view of a spoolpiece housing transducer pairs.

The precise arrangement of the four pairs of transducers may be further understood by reference to FIG. 1C. In some embodiments, four pairs of transducer ports are mounted on spoolpiece 100. Each pair of transducer ports corresponds to a single chordal path of FIG. 1B. A first pair of transducer ports 125 and 135 houses transducers 120 and 130 (FIG. 1A). The transducers are mounted at a non-perpendicular angle θ to centerline 105 of spool piece 100. Another pair of transducer ports 165 and 175 (only partially in view) house associated transducers so that the chordal path loosely forms an "X" with respect to the chordal path of transducer ports 125 and 135. Similarly, transducer ports 185 and 195 may be placed parallel to transducer ports 165 and 175 but at a different "level" (i.e. a different elevation in the spoolpiece). Not explicitly shown in FIG. 1C is a fourth pair of transducers and transducer ports. Taking FIGS. 1B and 1C together, the pairs of transducers are arranged such that the upper two pairs of transducers corresponding to chords M and N, and the lower two pairs of transducers corresponding to chords O and P. The flow velocity of the fluid may be determined at each chord M-P to obtain chordal flow velocities, and the chordal flow velocities combine to determine an average flow velocity over the entire pipe. Although four pairs of transducers are shown forming an X shape, there may be more or less than four pairs. Also, the transducers could be in the same plane or in some other configuration.

FIG. 2 illustrates an assembly 200 that couples to and/or within the transducer ports (e.g., 165, 175 of FIG. 1C). In particular, the assembly 200 comprises a wiring harness 202 having a connector 204 on a distal end 205 thereof. The wiring harness 202, and in particular connector 204, couple to a transducer port (not shown in FIG. 2) by way of a retaining nut 206 and transducer housing 208. The transducer assembly 210 electrically couples to the connector 204 of the wiring harness 202, and therefore the meter electronics, through an aperture in the retaining nut 206. The transducer assembly 210 telescopes into the transducer housing 208 and is held in place, at least in part, by the retaining nut 206. When the transducer assembly 210 and transducer housing 208 are engaged, a piezoelectric element 214 of the transducer assembly 210 acoustically couples to a matching layer 212. The transducer housing 208 and the transducer assembly 210 are each discussed in turn.

FIG. 3 shows a perspective cross-sectional view of a transducer housing 208 in accordance with certain disclosed embodiments. The housing 208 comprises a proximal end 318, distal end 302, and an internal volume 310. The distal end 302 is at least partially occluded by the acoustic matching layer 212. The acoustic matching layer 212 seals the distal end 302, and the exterior side 314 of the matching layer 212 is exposed to fluids flowing through the spoolpiece/meter (FIGS. 1A-C). Threads 306 on the outside diameter of the transducer housing 208 allow the housing 208 to be coupled to the spoolpiece (FIGS. 1A-C), and o-rings 308 seal the housing 208 to the transducer port (FIGS. 1A-C). In alternative embodiments, the transducer housing 208 is welded to the transducer port (FIGS. 1A-C) of the spoolpiece.

In some embodiments, the transducer housing 208 is metal such as low carbon stainless steel. In alternative embodiments any material capable of withstanding the pressure of the fluid within the meter, such as high density plastics or composite materials, may be equivalently used. In some embodiments the wall thickness of the transducer housing 208 is selected to compress slightly in response to the differential pressure between the fluid in the meter and the internal volume 310. The compression of the walls of the transducer housing 208 in these embodiments aids in holding the acoustic matching layer 212 in place. For example, the wall behind the acoustic matching layer deflects inward slightly, and the smaller inside diameter provides support to the acoustic matching layer to resist the lateral movement caused by the forces of fluid pressure within the meter. Moreover, during the process of bonding the acoustic matching layer 212 to the transducer housing 208, the housing 208 is stretched (within the elastic limit of the wall material) to accept the acoustic matching layer 212.

Figure 4:
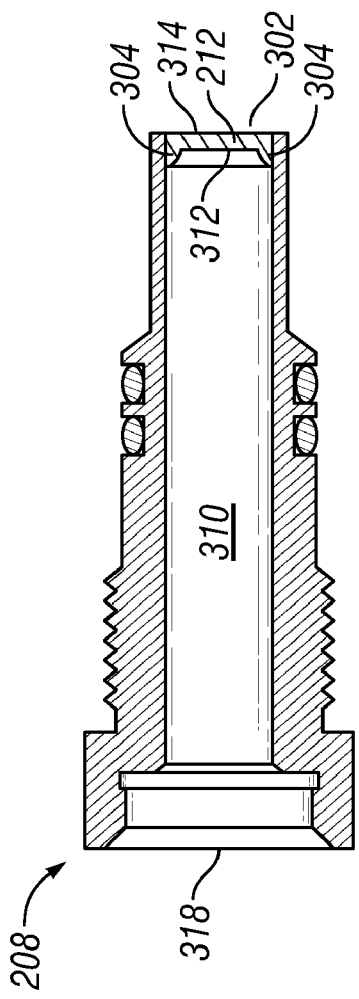
FIG. 4 illustrates an elevational cross-sectional view of a transducer housing in accordance with embodiments.

To aid in bonding the acoustic matching layer 212 to the transducer housing 208, in some embodiments the acoustic matching layer 212 has a meniscus 304 around the edge on the interior side 312. FIG. 4 illustrates an elevational cross-sectional view of the transducer housing 208 which further illustrates the meniscus 304 in accordance with these embodiments. In particular, the meniscus 304 of the acoustic matching layer 212 increases the contact area between the transducer housing wall and the acoustic matching layer 212, but preferably leaves sufficient surface area on the interior side 312 of the acoustic matching layer 212 to allow acoustic coupling between the piezoelectric element of the transducer assembly (not shown in FIG. 4). Thus, the transducer assembly 210 provides a space for the meniscus 304 to ensure that the meniscus 304 does not interfere with the coupling of the piezoelectric element to the matching layer 212.

The material of the acoustic matching layer 212 is one or more selected from the group: glass; ceramic; plastic; glass-filled plastic; or carbon-fiber filled plastic. Although some embodiments use 100% glass as the acoustic matching layer, alternative embodiments using plastic could have a glass content of 30% or less. Regardless of the material of the acoustic matching layer, the acoustic matching layer 212 provides acoustical coupling between the piezoelectric element 214 and fluid in the meter. In accordance with certain embodiments disclosed herein, the acoustic matching layer has an acoustic impedance between that of the piezoelectric element 214 and fluid within the meter. With the acoustic impedance of the matching layer between that of the piezoelectric element and the fluid in the meter, the quality of the ultrasonic signal is improved (e.g., larger amplitude and faster rise time). Glass is the preferred material for the acoustic matching layer since it has the desired acoustic impedance to provide good acoustic coupling while being strong enough to resist the pressure of the fluid within the meter so that the piezoelectric element can be isolated from the fluid in the within the meter. Comparatively, the acoustic impedance of a matching layer comprising substantially stainless steel is more than the acoustic impedance of the piezoelectric element, and therefore provides poor acoustic coupling. In some embodiments the acoustic impedance of the acoustic matching layer 212 is between about 1 and about 30 Mega-rayl (MRayl); or alternatively, between about 10 and about 15 MRayl.

When a transducer assembly 210 is inserted into the transducer housing 208, the piezoelectric element 214 (FIG. 2) of the transducer assembly 210 abuts the interior side 312 of the acoustic matching layer 212. To provide good acoustic coupling, the interior 312 and exterior 314 faces of the acoustic matching layer 212 are substantially flat and substantially parallel to one another. In some embodiments, the faces are flat to within 0.001 inch or better and parallel to within 0.003 inches or better. Additionally, the transducer assembly 210 is positioned such that the piezoelectric element 214 is centered against the acoustic matching layer 212. Transducer housings 208 with acoustic matching layers as discussed herein may be manufactured by and purchased from Dash Connector Technology of Spokane Wash.

The acoustic matching layer 212 has a thickness (along an axis shared with the remaining portions of the transducer housing 208) that in some embodiments is substantially equal to an odd multiple of one-quarter (¼, ¾, ⅝, ⅞, etc.) wavelength of the sound generated by the piezoelectric element 214. For example, consider a piezoelectric element 214 operating at a frequency of 1 MHz and an acoustic matching layer 212 with a speed of sound of 5,000 m/s. The wavelength of the sound in the matching layer is approximately 0.197 inches. In these embodiments the acoustic matching layer may be 0.049, 0.148, 0.246, 0.344, and so on, inches thick. A thinner acoustic matching layer gives better acoustical performance, but making the acoustic matching layer thicker enables the transducer housing 208 to withstand higher pressures. Picking the optimal matching layer thickness involves choosing the thinnest matching layer that can hold the highest pressures expected inside the meter.

To reduce electrical noise and double the drive voltage, it is often desirable to electrically connect the piezoelectric element differentially (discussed below), which means the portion of the piezoelectric element that abuts the acoustic matching layer may have an electrically conductive coating. If the acoustic matching layer is metallic, a thin electrical insulator is used between the metal and piezoelectric element 214 for electrical isolation. To address this concern, in some embodiments the acoustic matching layer 212 is an electrical insulator, thus reducing or eliminating the need for additional electrical insulation.

Figure 5:
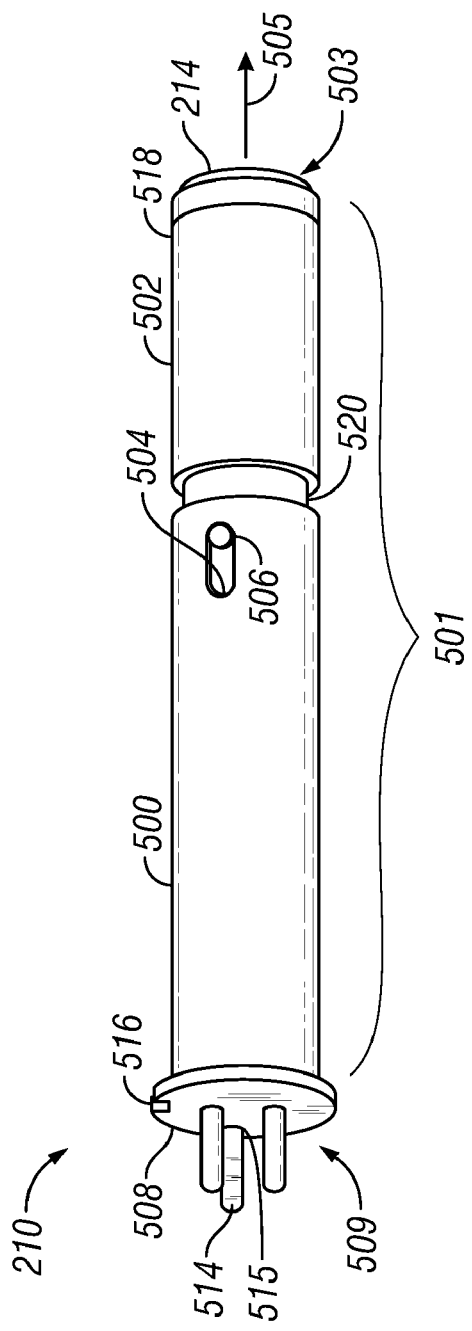
FIG. 5 illustrates an integrated transducer assembly in accordance with embodiments.

Attention now turns to the integrated transducer assembly 210. FIG. 5 illustrates a perspective view of a transducer assembly 210. The transducer assembly 210 comprises an elongated outer housing 501 having an axis 505 (shown as axis "X" in FIG. 6) along its elongated direction. In some embodiments, the elongated outer housing 501 comprises a first portion 500 and a second portion 502, each having a common axis 505. In these embodiments, the second portion 502 telescopically couples to the first portion 500, such that the first portion 500 and second portion 502 may move relative to teach other in an axial direction. Further, the elongated outer housing 501 may be cylindrical in shape, but other shapes may be equivalently used.

In embodiments where the elongated outer housing 501 comprises a first portion 500 and second portion 502, the outside diameter of the second portion 502 at the crystal or distal end 518 is substantially the same as the first portion 500. However, the second portion 502 also comprises a reduced diameter portion 520, which telescopes within the internal diameter of the first portion 500, and thus has an outside diameter slightly smaller than the inside diameter of the first portion 500. In some embodiments, the length of engagement of the first and second portions 500 and 502 is approximately equal to the outside diameter, but longer and shorter engagements may be equivalently used. The outside diameter of the elongated outer housing 501 is slightly smaller than the inside diameter of the transducer housing 208, which helps ensure the piezoelectric element location is accurately known.

In accordance with some embodiments, the second portion 502 is made of plastic (e.g., Ultem 1000). In these embodiments the axial length of the second portion 502 is reduced (in comparison to the axial length of the first portion 500, which is preferably metallic) because the shorter length lowers manufacturing cost, but also when made of a plastic material the second portion 502 tends to absorb moisture and swell. Swelling of the second portion 502 is tolerable, and reducing the axial length of the second portion 502 enables removal of the transducer assembly 210 from the transducer housing 208 in spite of swelling.

Relative rotational movement of the first and second portions 500 and 502 and axial displacement are restricted by a pin 506 extending radially from the second portion 502 through an aperture 504 in the first portion 500. In some embodiments, three such pin and aperture combinations are used, but as few as one and greater than three of the pin and aperture combinations may be equivalently used. Alternatively, the second portion 502 may be designed to have a protrusion that interacts with the aperture 504 as an integral part of the second portion 502.

While the piezoelectric element 214 couples to and at least partially occludes the first end 503 of the elongated outer housing 501, electrical pin holder 508 couples to and at least partially occludes a second end 509 of the elongated outer housing 501. The elongated outer housing 501 first portion 500 may comprise connection key 514, which helps ensure the integrated transducer assembly is properly oriented for coupling with the connector 204 key slot. Electrical pin holder 508 may comprise a slot 515 which engages the connection key 514 preventing rotation of the electrical pin holder 508 within the elongated outer housing 501. Additionally, the electrical pin holder 508 may further comprise an anti-rotation slot 516 which, in combination with a tab on the transducer housing 208, keeps the integrated transducer assembly 210 from rotating in the transducer housing 208. The second end 509 of the elongated outer housing 501 has an internal diameter that is a sliding fit to a small outside diameter of the pin holder 508. The pin holder 508 may desirably be made from Ultem 1000, but any rigid, non-conducting material can be used.

Figure 6:
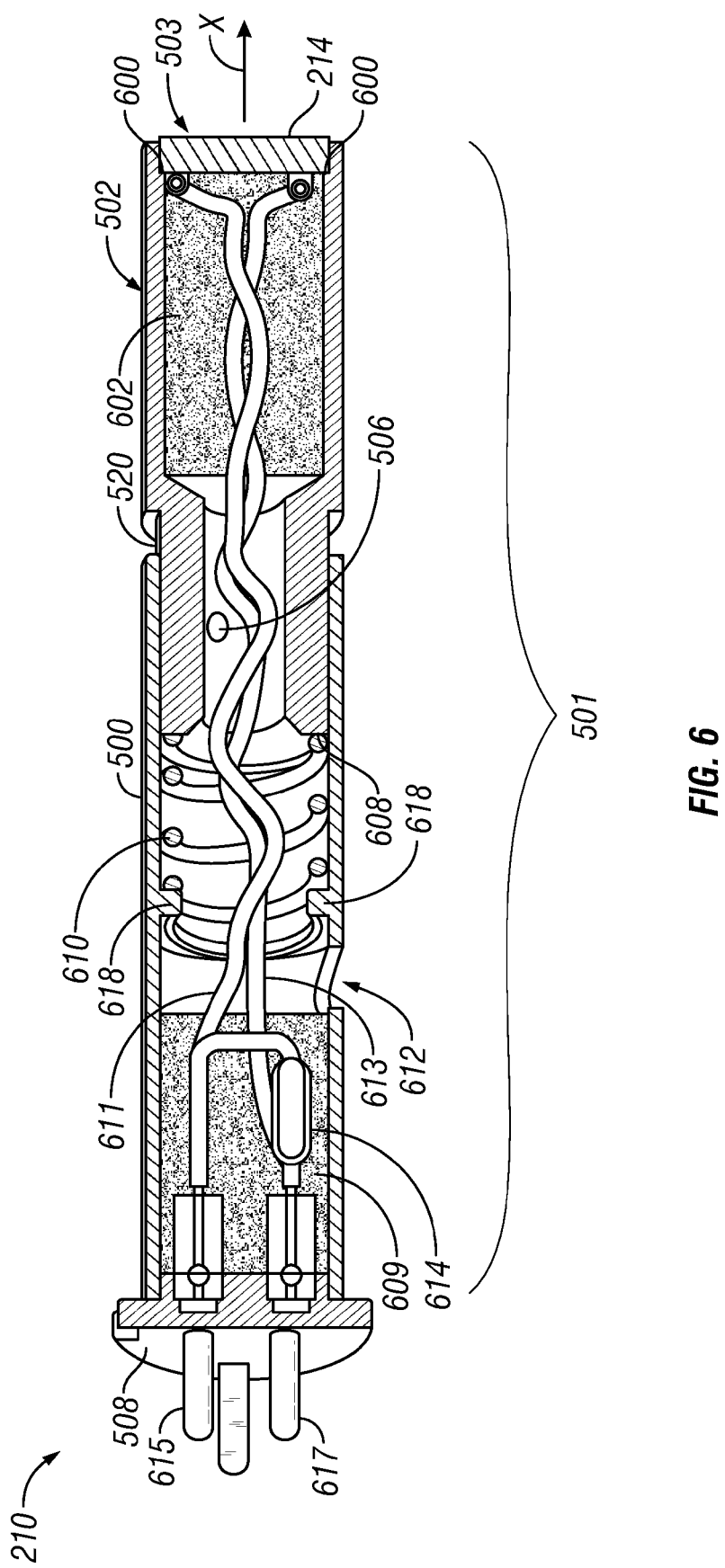
FIG. 6 illustrates a perspective cross-sectional view of an integrated transducer assembly in accordance with embodiments.

FIG. 6 illustrates a perspective cross-sectional view of the transducer assembly 210. In at least some embodiments, the piezoelectric element 214 is electrically isolated from the transducer housing 208, and thus at least the second portion 502 is made of a rigid non-conducting material as discussed above. The inside diameter of the elongated outer housing 501 and the outside diameter of the piezoelectric element 214 are selected such that there is space between the transducer assembly 210 and the transducer housing 208 into which the transducer assembly 210 is inserted. This space provides room for clearance for the meniscus 304 (of FIGS. 3 and 4) of the acoustic matching layer. This space also provides room for excess oil or grease that may be applied to the piezoelectric element's 214 exterior surface prior to insertion into the transducer housing 208 in order to improve acoustic coupling of the piezoelectric element 214 and acoustic matching layer 212.

A shoulder 600 in the elongated outer housing 501 abuts the piezoelectric element 214 to resist axial movement of the piezoelectric element, such as axial movement caused by forces imparted when the transducer assembly 210 is mounted within the transducer housing 208. The volume behind the piezoelectric element 214 comprises a back matching layer 602 (e.g., epoxy, powder-filled epoxy, rubber, powder-filled rubber), and serves several purposes. For example, the back matching layer couples the piezoelectric element 214, and one or more wires attached to the piezoelectric element 214, to the elongated outer housing 501. In particular, the mass of the back matching layer improves the acoustic output of the piezoelectric element 214 by reducing ringing and increasing bandwidth of the acoustic signal. In some embodiments, the length of the back matching layer (measured along the axis of the elongated outer housing) is selected such that the round trip travel time of an ultrasonic signal in the back matching layer 602 occurs at a time greater than the time of measurement of a received signal. For example, if the fourth zero crossing in the received signal is used as the measurement point, then the round trip travel time would preferably be greater than two cycles at the center frequency of operation of the piezoelectric element. Alternatively, the length of the back matching layer 602 is from about 1 to about 9 wavelengths of sound in the back matching layer at the center frequency of operation of the piezoelectric element. The appropriate length ensures that any reflected acoustic signals do not arrive at the piezoelectric element during the ultrasonic meter's signal transit timing.

Considering further the elongated outer housing 501 comprising a first portion 500 and second portion 502, the reduced diameter portion 520 of the second portion 502 comprises a shoulder 608. The shoulder is small enough to allow passage for wires through an aperture therein, and to allow an opening for injecting the back matching layer 602. The back matching layer may be injected with a syringe with a small plastic tip. Chamfers are provided on the ends of this shoulder 608 to ensure no sharp edge is created which could damage wires. The shoulder 608 is a location upon which a biasing mechanism (discussed below) may push when biasing the second portion 502.

In embodiments where the elongated outer housing 501 comprises a first portion 500 and second portion 502 that are allowed to move axially relative to each other, the transducer assembly 210 comprises a biasing mechanism, such as spring 610. The biasing mechanism biases the first portion 500 and second portion 502 away from each other along the common axis X. The force with which the biasing mechanism biases the first portion 500 and second portion 502 away from each other is, in some embodiments, from about 4 to about 12 pounds. In alternative embodiments, the biasing mechanism may be any mechanism to provide the biasing force, such as a washer, a piece of rubber, or combinations of springs, washers and/or pieces of rubber.

Spring 610 is slightly compressed against shoulder 618 during assembly and at least one pin (partially shown at 506) an aperture combination (FIG. 5) limit axial and rotational movement of the second portion 502 within the first portion 500. Once the transducer assembly 210 is installed the transducer housing 208, the retaining nut 206 (FIG. 2) further compresses the spring 610. This compression compensates for the tolerances of the assembled parts to ensure that the exterior side of the piezoelectric element 214 is in good contact to the interior side 312 of the acoustic matching layer 212 (FIG. 4). Once the connector 204 (FIG. 2) is assembled the spring 610 may be compressed further. The spring force may be on the order of 4.9 pounds once the connector 204 is in place. In alternative embodiments, the connector 204 need not apply further compressive force on the spring. In embodiments where the elongated outer housing 501 is a single structure, the force to ensure good coupling between the piezoelectric element 214 and the acoustic matching layer 212 (FIG. 4) may be supplied by the retaining nut 206 (FIG. 2) and/or the connector 204 (FIG. 2).

The pin holder 508 holds two connection pins 615 and 617 at the desired spacing and exposed length. The pins mate with the connector 204, providing electrical connection of the transducer assembly with the electronics of the meter. Electrical pin 615 couples to the piezoelectric element 214 by way of a first wire 611 that runs through the interior of the elongated outer housing 501. Likewise, second pin 617 couples to the piezoelectric element 214 by way of second wire 613 that also runs through the interior of the housing 501. In some embodiments, multi-strand copper wire with PTFE insulation is used for wires 611, 613, but other types of wire may be equivalently used. In order to hold the wires 611 and 613 in place, as well as possibly the resistor 614 (discussed below) and electric pin holder 508, an adhesive 609 such as epoxy is inserted through the epoxy fill port 612. In some embodiments, the connection pins 615 and 617 are robust gold plated brass pins which have solder connection pockets, but other pins may be equivalently used. Two different colors of wire insulation are used to ensure the correct polarity of the crystal faces and connection pin orientation with the connection key on the case are maintained during manufacturing. The wires are twisted during assembly to ensure that any induced electrical signals in the wires are equalized to avoid such signals from interfering with crystal impulses during measurement cycles.

A one mega ohm resistor 614 couples between the pins 615 and 617, thus coupling the two electrode plated faces (discussed below) of the piezoelectric crystal. This resistor 614 provides a short at low frequencies to discharge any electrical energy generated by mechanical shock or temperature changes during transportation or installation. At the high frequency (~1 MHz) of operation of the transducer, the resistor 614 has virtually no effect on the electrical signal sent to or generated by the piezoelectric crystal. One lead of the resistor is insulated by insulation tubing to avoid shorting of this lead to the case during manufacturing. Alterative transducer designs may comprise additional electrical components within the integrated transducer assembly (e.g., inductors, amplifiers, switches, zener diodes, or capacitors). The use of these components may be individually or in many combinations.

Figure 7B:
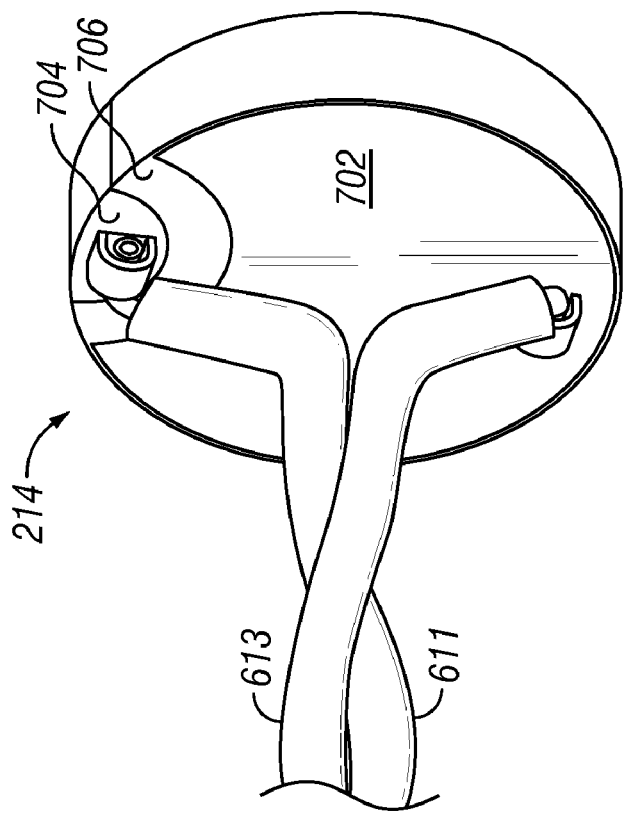
FIG. 7B illustrates a perspective view of the back face of a piezoelectric element in accordance with embodiments.
Figure 7A:
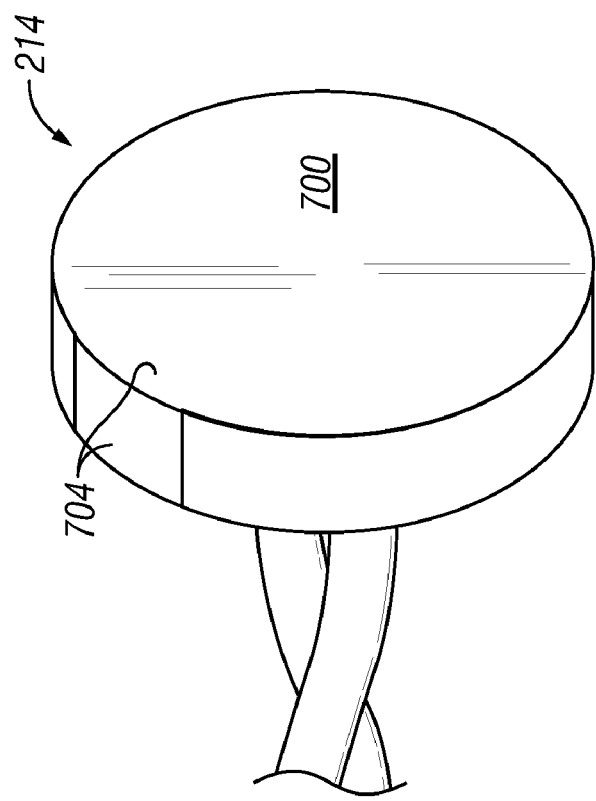
FIG. 7A illustrates a perspective view of the front face of a piezoelectric element in accordance with embodiments.

FIGS. 7A and 7B illustrate electrical coupling to the piezoelectric element 214. In some embodiments, the piezoelectric element 214 is a piezoelectric crystal, such as PZT-5A or other similar material. The thickness, diameter and material properties of the crystal control the frequency of the ultrasonic signal that is emitted. The exterior side 700 is the side of the piezoelectric element 214 that couples to the acoustic matching layer (FIGS. 3 and 4). The exterior side 700 and interior side 702 of the piezoelectric element are at least partially plated with silver or other metals to create electrode surfaces. A portion 704 of the plating on the exterior side 700 extends around the periphery of the crystal to the interior side 702. The plating of the exterior side 700 (comprising the portion 704) and the plating of the interior side 702 are electrically isolated by a region 706 having no plating. Plating in this manner enables coupling of both wires 611 and 613 to the interior side 702 of the piezoelectric element 214. The plating arrangement as illustrated allows the exterior side 700 to be flat for good contact to the acoustic matching layer. Alternatively, one wire may extend around the piezoelectric element and couple to the exterior side 700. In these embodiments, a portion of the housing 501 (FIGS. 5 and 6) is notched to allow passage of the wire. Moreover, in these embodiments where one of the wires couples directly to the exterior surface 700, the acoustic matching layer 214 is notched to accommodate the wire. In yet further embodiments, a first wire couples to the interior side 702 of the piezoelectric element and the second wire couples to the periphery or edge of the piezoelectric element. In an additional embodiment, a first wire couples to the interior side 702 while a second wire couples to plating from exterior side 700 that extends into a hole through the center of the crystal.

Figure 8:
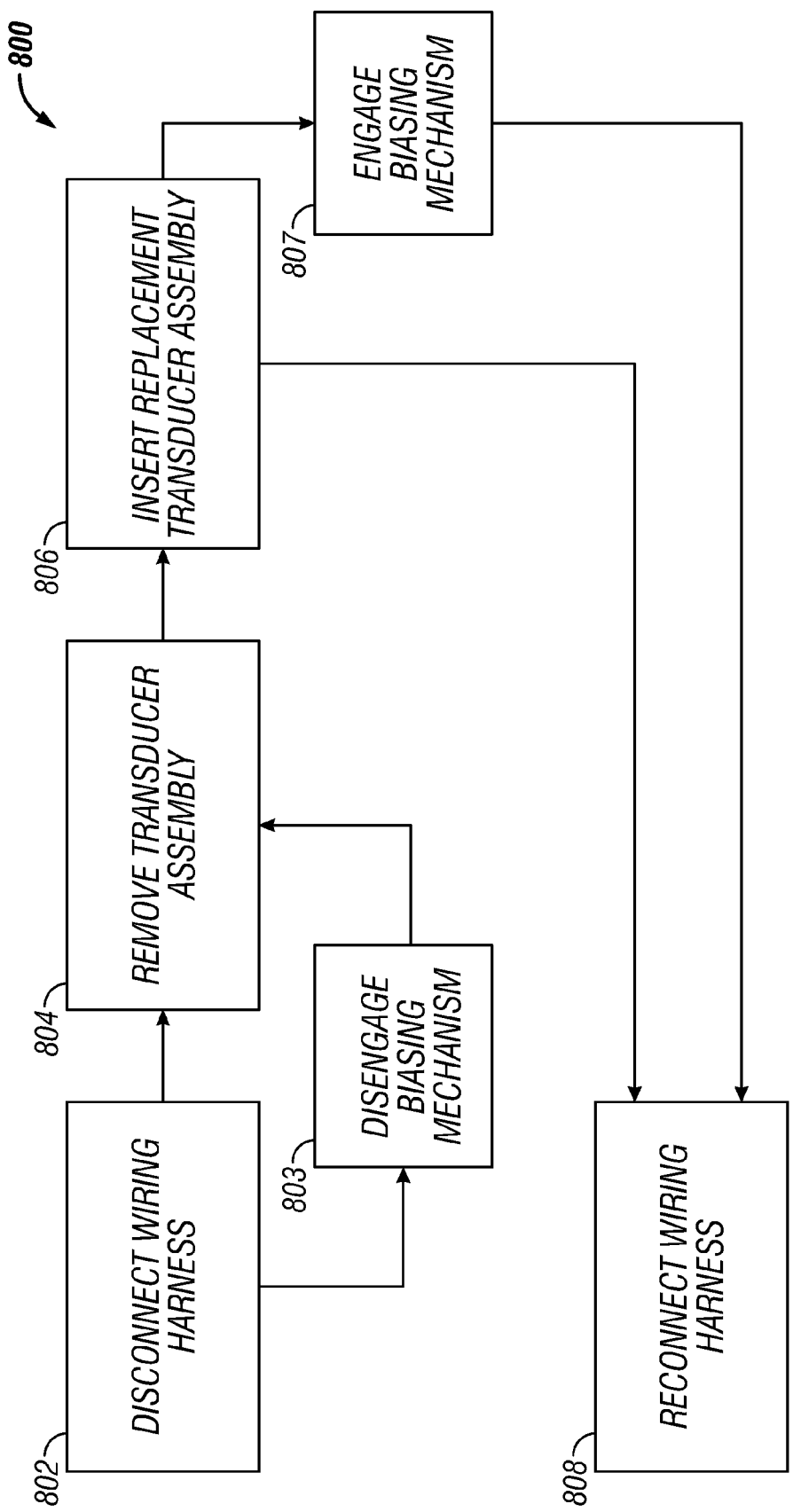
FIG. 8 is a flow diagram illustrating methods of replacing a transducer assembly in accordance with embodiments.

Referring now to FIG. 8, a method 800 is disclosed whereby the transducer assembly 210 is replaced while fluid is still flowing through the flow meter 101 (i.e., while the flow meter 101 contains pressurized fluid). For example, the original transducer assembly 210 may be replaced with a different transducer assembly 210 containing a piezoelectric element 214 that resonates at a different frequency or frequencies than does the original transducer assembly 210. Alternatively, the original transducer assembly 210 may be replaced with a different transducer assembly 210 because the original transducer assembly 210 is defective or has failed. The method 800 comprises disconnecting the wiring harness (block 802) that electronically couples the electronics of the ultrasonic meter (FIGS. 1A-C) to the transducer assembly 210, all while fluid is passing through the flow meter 101. If used, the biasing mechanism is disengaged (block 803) while fluid is passing through the flow meter 101, such as by loosening and removing nut 206 (FIG. 2). Thereafter, the transducer assembly 210 is removed as a single unit from the transducer housing 208 while fluid is passing through the flow meter 101 (block 804). A replacement transducer assembly 210 is inserted into the transducer housing (again, as a single unit) while fluid is passing through the flow meter 101 (block 806). In some embodiments, the biasing mechanism is engaged (e.g., by installing retaining nut 206), again while fluid is passing through the flow meter 101 (block 807). Finally, the wiring harness is reconnected while fluid is passing through the flow meter 101 (block 808).

Figure 9A:
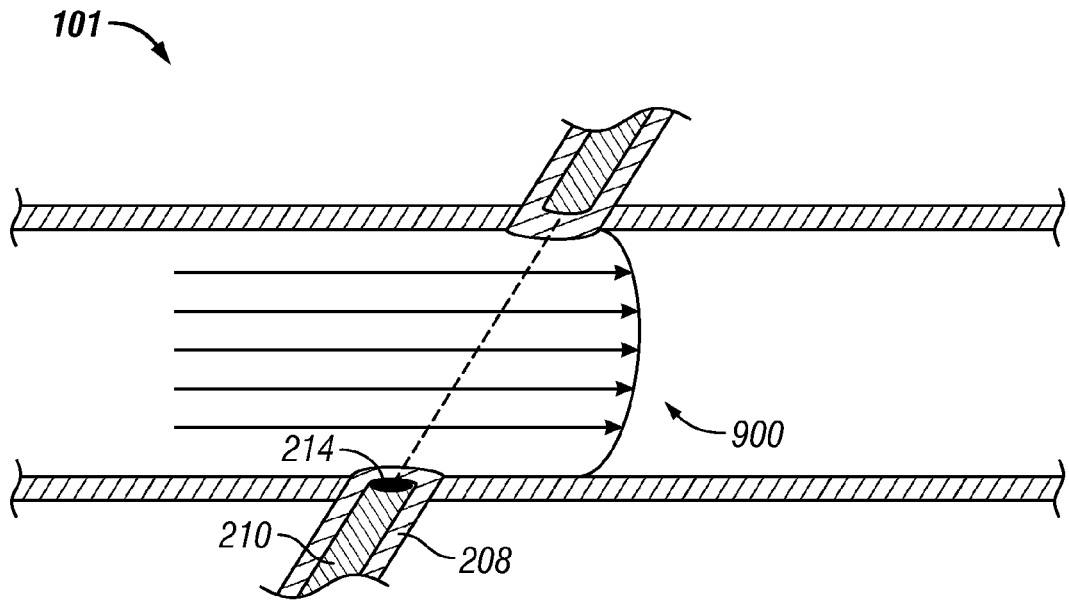
FIGS. 9A-9C contain a series of configurations illustrating the replacement of a transducer assembly while fluid is flowing through the meter, in accordance with embodiments.
Figure 9B:
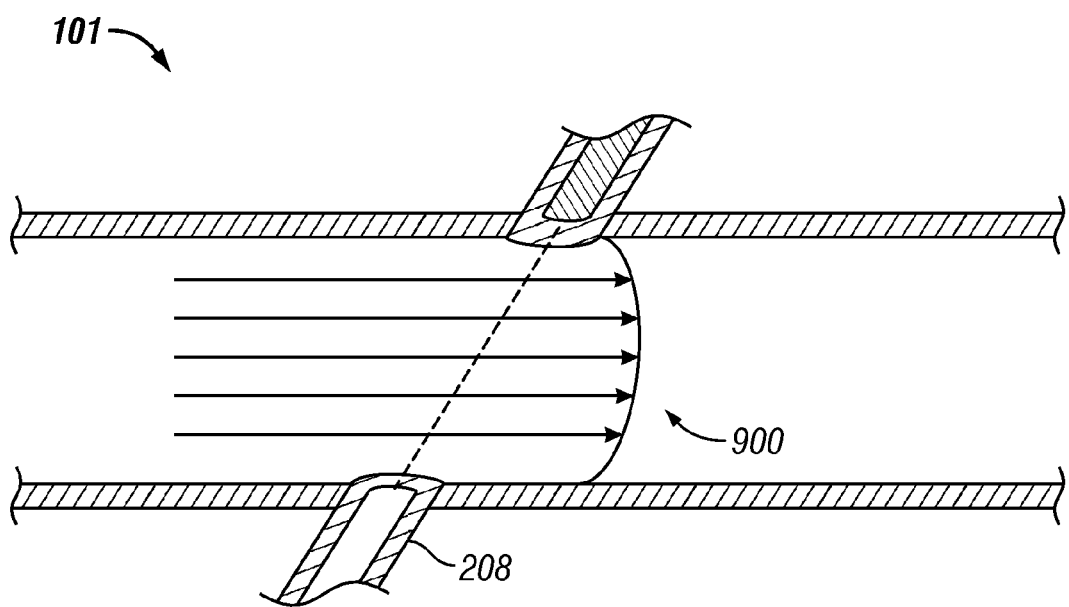
Figure 9C:
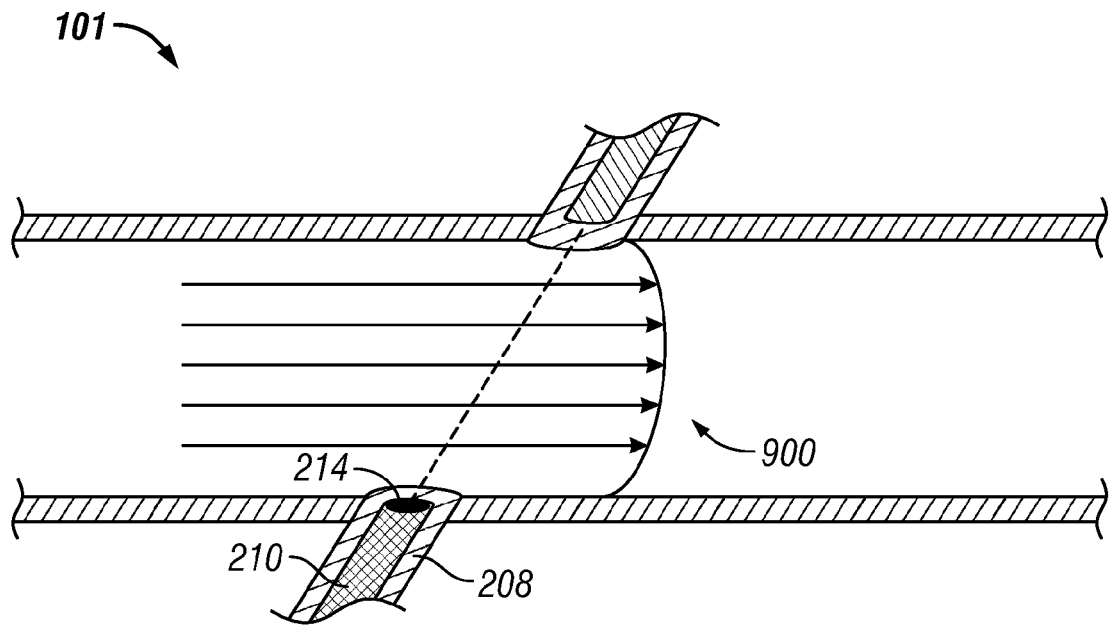

FIGS. 9A-C illustrate the steps of method 800 described above. In particular, FIG. 9A shows the flow meter 101 with a transducer assembly 210 coupled to a transducer housing 208. The transducer assembly 210 and transducer housing 208 are depicted by hash markings for simplicity, clarity and ease of explanation. The transducer assembly 210 comprises a piezoelectric element (e.g., crystal) 214. Arrow 900 points to a depiction of fluid continuously flowing through the flow meter 101 while the transducer assembly replacement process of FIGS. 9A-C is being performed.

The transducer assembly 210 may fail. Alternatively, in some cases, the transducer assembly 210 may contain a piezoelectric element 214 that resonates at a frequency or frequencies that are different from the desired frequency or frequencies. Accordingly, as shown in FIG. 9B, the transducer assembly 210 may be removed from the transducer housing 208 while fluid is continuously flowing through the flow meter 101. Transducer assembly removal techniques are described above in relation to FIG. 8. Removal of only the transducer assembly 210 is facilitated at least in part by the inventor's realization that the matching layer 212 (FIGS. 2-7B) of the transducer housing 208, unlike other matching layers that are manufactured using different material, can properly operate with piezoelectric elements that resonate at various frequencies. Thus, removal of the transducer housing 208 is unnecessary for replacement of the transducer assembly 210, and fluid may continue to flow uninterrupted through the flow meter 101 while the transducer assembly 210 is replaced. Finally, as shown in FIG. 9C, the original transducer assembly 210 is replaced with a different transducer assembly 210 (depicted using hash marks different from those used to depict the original transducer assembly in FIG. 9A). The newly-installed transducer assembly 210 may have, e.g., a different piezoelectric element 214 that resonates at different frequencies than does the original transducer assembly 210.

In some embodiments, a piezoelectric element 214 may be chosen to have a frequency such that the acoustic matching layer 212 still acts as a quarter-wavelength matching layer. For example, consider a transducer operating at 1 MHz with an acoustic matching layer that is 5/4 of a wavelength thick at 1 MHz. Table 1 describes other frequencies at which the acoustic matching layer 212 acts as a quarter-wavelength matching layer:

TABLE 1

Different frequencies at which an acoustic matching layer with a thickness of 0.225 inches and speed of sound of 15,000 ft/sec acts as a quarter-wavelength matching layer

| Frequency (MHz) | Matching Layer Thickness (Inches) | Matching Layer Thickness (Wavelengths) |
|---|---|---|
| 0.20 | 0.225 | 1/4 |
| 0.60 | 0.225 | 3/4 |
| 1.00 | 0.225 | 5/4 |
| 1.40 | 0.225 | 7/4 |

For instance, if a high-viscosity liquid began flowing through the flow meter 101 and a loss of signal between transducer assemblies resulted, the 1 MHz transducer assembly 210 could be removed and replaced with a 0.60 MHz or 0.20 MHz transducer assembly to increase signal amplitudes, since acoustic absorption due to viscosity is proportional to the frequency squared. Alternatively, if a higher frequency is desired (e.g., to improve timing accuracy and hence flow rate measurement accuracy), the 1 MHz transducer assembly 210 could be removed and replaced with a 1.40 MHz transducer assembly.

The frequency of the transducer assembly 210 is varied by adjusting the shape of the piezoelectric element 214 to alter the resonant frequencies of the element 214. Piezoelectric elements (e.g., crystals) typically have different resonance modes. One such mode is the thickness mode in which the resonance frequency increases with decreasing thickness of the piezoelectric element 214. Another mode is a radial mode in which the resonance frequency increases with decreasing radius of the piezoelectric element 214. More complex modes arise as holes are added to the piezoelectric element 214 or the thickness and radius of the piezoelectric element 214 are of similar magnitude. Generally, a large variety of resonance modes is achievable by varying the geometry of the piezoelectric element 214. The resonance frequency can also be varied by changing the piezoelectric material of piezoelectric element 214. Additionally, a given piezoelectric element 214 may have more than one resonance mode.

An alternative method to adjusting transducer frequency while pressurized liquid is flowing through the flow meter 101 employs a piezoelectric element with multiple resonance modes. Generally, characteristics of the piezoelectric element may be manipulated to achieve multi-frequency resonance. For example, the thickness of the piezoelectric element may be adjusted to obtain a particular resonance frequency, while the radius of the piezoelectric element may be adjusted to obtain a different resonance frequency subject to the constraint that piezoelectric element 214 still fits within transducer housing 208. Assuming that a piezoelectric element resonates at both 0.2 MHz and 1.0 MHz, for example, the acoustic matching layer described in Table 1 above acts as a quarter-wavelength matching layer for both of these resonance frequencies.

The various frequencies of such a piezoelectric element may be activated by adjusting the transducer drive voltage applied at pins 615, 617 to excite the desired resonance frequency. For example, the 0.2 MHz resonance may be excited with the application of one cycle of a 0.2 MHz square wave, while the 1.0 MHz resonance could be excited with the application of one cycle of a 1 MHz square wave. By applying transducer drive voltages of varying frequencies to a piezoelectric element that resonates at multiple frequencies, the frequency at which the element resonates can be adjusted without having to manually remove the transducer assembly 210 from the transducer housing 208.

The frequency at which a multi-frequency piezoelectric element resonates may be manually or automatically adjusted. With manual frequency selection, the transducer drive voltage signal may be adjusted to obtain the desired element resonance frequency. If a different resonance frequency is desired to improve signal amplitude and/or timing accuracy, the element resonance frequency may again be manually adjusted by altering the transducer drive voltage signal.

With automatic frequency selection, electronic circuitry within the flow meter 101 may regularly or intermittently measure the amplitude of the signals output by the piezoelectric element into the fluid housed by the flow meter 101. In some embodiments, the piezoelectric element could resonate at a first frequency until the electronics within the flow meter 101 determine that the amplitude of the signal being output by the element exceeds a predetermined threshold. At that point, the piezoelectric element could be made to resonate at a second, different frequency. If the amplitude of the signal produced using the second frequency is below the threshold, or at least if the amplitude is below that of the signal produced using the first frequency, the piezoelectric element may revert to using the first frequency. In alternative embodiments, a series of frequencies could be used and the amplitude of each resulting signal would be measured. The frequency that produced the signal with the greatest amplitude (or, alternatively, the frequency that produced the signal with the amplitude closest to the desired amplitude) is implemented.

In some embodiments, multiple piezoelectric element frequencies may be excited at the same time. The resulting signal waveform may be recorded and then, using any suitable technique, digitally filtered to separate the signals for the different frequencies. Each of the signals may subsequently be analyzed to determine which of the signals provided the greatest signal amplitude and most favorable timing accuracy. The signal that provided the greater signal amplitude and timing accuracy is selected as the signal used in the flow meter 101 to determine flow characteristics. To properly excite multiple resonance frequencies as in these embodiments, selection of the piezoelectric elements and acoustic matching layers should be properly coordinated. For example, consider an illustrative acoustic matching layer that is one-quarter of a wavelength thick at a frequency of 0.5 MHz. Thus, this matching layer will act as a proper matching layer for resonance frequencies of 0.5 MHz, 1.5 MHz, 2.5 MHz, etc. If a piezoelectric element having a thickness resonance of 0.5 MHz is used, the element will exhibit additional resonances at the odd harmonics of 1.5 MHz, 2.5 MHz, etc. Thus, because the matching layer matches for resonance frequencies of 0.5 MHz, 1.5 MHz, 2.5 MHz, . . . , and because the piezoelectric element's primary and odd harmonics include 0.5 MHz, 1.5 MHz, 2.5 MHz, . . . , the matching layer will serve as a proper quarter-wavelength matching layer for the primary and odd harmonic resonance frequencies of the piezoelectric element. The piezoelectric element's multiple resonance can be excited simultaneously using 2 cycles of a 0.5 MHz square wave which exhibits peaks in its frequency spectra at 0.5 MHz, 1.5 MHz, 2.5 MHz, . . . . The scope of this disclosure is not limited to the particular matching layer and piezoelectric element parameters disclosed herein.

Figure 9D:
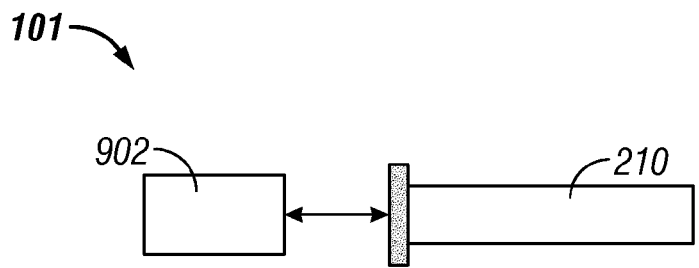
FIG. 9D shows a block diagram of the transducer assembly coupled to electronic logic, in accordance with embodiments.

As mentioned above, quality analysis of transducer signals is performed by electronic circuitry coupled to or housed within the flow meter 101. FIG. 9D shows a block diagram of part of the flow meter 101. As shown, flow meter 101 includes the transducer assembly 210 (and its contents) coupled to electronic logic 902. Electronic logic 902 includes circuitry (e.g., processor, memory, etc.) that controls the application of a drive voltage to the piezoelectric element housed within the transducer assembly 210. Thus, for example, a transducer assembly in the flow meter 101 that receives a signal from the fluid may pass the signal to its electronic logic. The electronic logic may provide the signal (e.g., via wire or wirelessly), or data pertaining to the signal, to the electronic logic of the transducer assembly that transmitted the signal. The electronic logic of the transmitting transducer assembly then may analyze the signal/signal data to determine how the drive voltage to the piezoelectric element should be adjusted, if at all. In this way, a feedback loop is created whereby the electronic logic of the transducer assembly responsible for transmitting the signal can adjust the drive voltage signal (e.g., voltage, frequency, signal type, timing, etc.) provided to the piezoelectric element. This feedback loop may be manipulated as desired to implement the embodiments disclosed herein or variations thereof.

Figure 10:
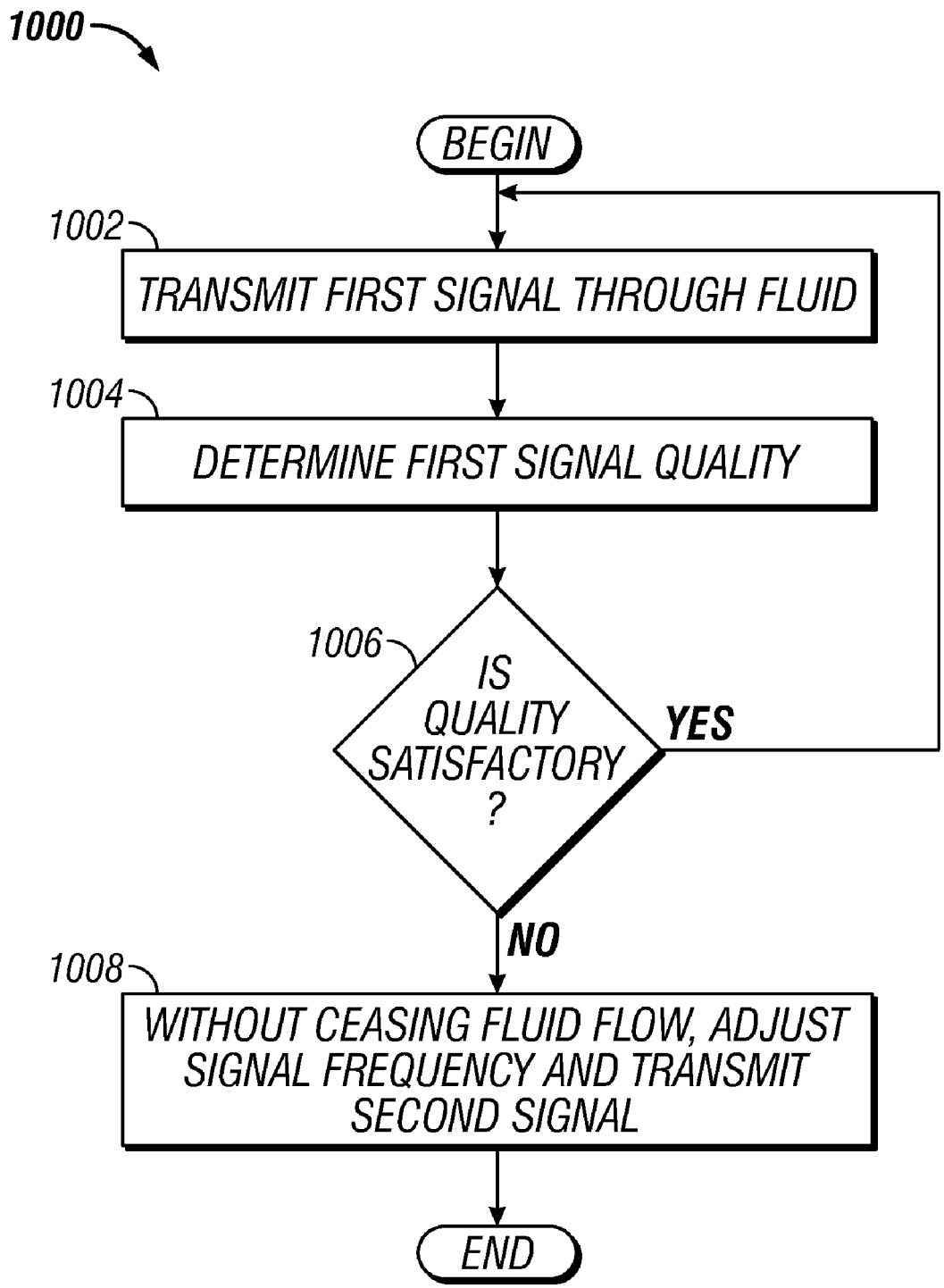
FIG. 10 shows a flow diagram illustrative a method of replacing a transducer assembly while fluid is flowing through the meter, in accordance with embodiments.

FIG. 10 shows a flow diagram of an illustrative method 1000 implemented in accordance with embodiments. The method 1000 comprises transmitting a first signal through fluid in the flow meter (block 1002). The method 1000 also comprises determining the quality of the first signal (block 1004). Signal quality may be determined based on, e.g., signal amplitude and timing accuracy as the signal passes through the fluid in the flow meter. In at least some embodiments, signal quality may be determined using the feedback loop described above. If the signal quality is not satisfactory (block 1006), the method 1000 comprises adjusting the signal frequency and transmitting a second signal of a different frequency (block 1008). The signal frequency may be adjusted using any suitable technique. In some embodiments, the signal frequency is physically adjusted by replacing the piezoelectric element with a different piezoelectric element, all while continuing to pass fluid through the flow meter. Alternatively, the frequency may be adjusted by varying the transducer drive voltage applied to the element. The voltage itself may be altered, as may the frequency of the signal applied, the type of signal applied (e.g., square wave signals or other types of waveforms), etc.

The drive voltage may be adjusted either manually or automatically. If adjusted manually, the quality of a particular emitted signal is determined and, if the quality is below a predetermined threshold, the drive voltage may be adjusted to produce a different signal at a different frequency. If done automatically, the electronic logic 902 may cycle through a plurality of frequencies and signals to find the signal with the best quality. The logic 902 may then implement that signal. Further still, in some embodiments, the piezoelectric element may be capable of simultaneously resonating at multiple frequencies. In such embodiments, the element may simultaneously emit multiple signals into the fluid. A complementary transducer assembly, housed within the flow meter 101, may capture the signals from the fluid. The electronic logic associated with the complementary transducer assembly (or, alternatively, the electronic logic associated with the transmitting transducer assembly) may separate the signals using any suitable technique and may then analyze the signals' quality. The signal with the highest quality may be implemented. The steps of method 1000 may be performed in any suitable order. Steps may be added to or deleted from method 1000.

While various embodiments have been shown and described, modifications thereof can be made by one skilled in the art without departing from the spirit or teaching herein. The embodiments described herein are exemplary only and are not limiting. Accordingly, the scope of protection is not limited to the embodiments described herein, but is only limited by the claims which follow, the scope of which shall include all equivalents of the subject matter of the claims.

What is claimed is:

1. A method, comprising:
    without ceasing flow of fluid through a flow meter:
        transmitting an ultrasonic signal of a first frequency through said fluid;
        determining the quality of said ultrasonic signal;
        adjusting said first frequency to a second frequency as a result of said quality failing to meet a threshold; and
        transmitting another ultrasonic signal of said second frequency through said fluid.

2. The method of claim 1, wherein adjusting said first frequency to the second frequency comprises replacing a piezoelectric element used to generate the first frequency with a different piezoelectric element used to generate the second frequency.

3. The method of claim 2, wherein replacing said piezoelectric element with said different piezoelectric element is done without removing a transducer housing from said flow meter, the transducer housing capable of alternately housing the piezoelectric element and said different piezoelectric element.

4. The method of claim 1, wherein adjusting said first frequency to the second frequency comprises adjusting the drive voltage applied to a piezoelectric element used to generate both said first and second frequencies.

5. The method of claim 4 further comprising:
    determining a quality of the ultrasonic signal and determining a quality of said another ultrasonic signal;
    comparing said qualities to determine which of the ultrasonic signal and said another ultrasonic signal has a higher quality; and
    based on said comparison, transmitting either said ultrasonic signal or said another ultrasonic signal.

6. The method of claim 1, further comprising using a single, common acoustic matching layer for both the ultrasonic signal and the another ultrasonic signal.

7. The method of claim 6, wherein said acoustic matching layer comprises a material selected from the group consisting of glass, ceramic, plastic, glass-filled plastic and carbon-fiber-filled plastic.

8. A flow meter, comprising:
    a piezoelectric element configured to resonate at different frequencies;
    a matching layer adjacent to said element and configured to perform acoustic impedance-matching said different frequencies; and
    circuitry configured to determine quality of signals traversing fluid passing through the flow meter;
    wherein the element emits a first signal through fluid passing through the flow meter;
    wherein, based on a determination by the circuitry that the quality of said first signal fails to meet a threshold, the element emits a different signal in lieu of the first signal, said first signal and the different signal having different frequencies.

9. The flow meter of claim 8, wherein the element emits said different signal as a result of the varying of a drive voltage applied to the element.

10. The flow meter of claim 8, wherein said matching layer is used both when the element emits said first signal and when the element emits said different signal.

11. The flow meter of claim 8, wherein said evaluation comprises the determination of first signal amplitude and first signal timing accuracy as the first signal is passed through said fluid.

12. The flow meter of claim 8, wherein said matching layer comprises a material selected from the group consisting of glass, ceramic, plastic, glass-filled plastic and carbon-fiber-filled plastic.

13. The flow meter of claim 8, wherein the first signal comprises multiple frequencies.

14. The flow meter of claim 13, wherein the element emits the different signal based on an evaluation of the quality of each of the multiple frequencies of the first signal, and the different signal comprises a single one of the multiple frequencies of the first signal.

15. The flow meter of claim 13, wherein the element emits the different signal based on a determination of which one of the multiple frequencies of a collected sample of the first signal has a higher quality level than the other of the multiple frequencies.

* * * * *